(12) United States Patent
Feng et al.

(10) Patent No.: US 10,410,353 B2
(45) Date of Patent: Sep. 10, 2019

(54) MULTI-LABEL SEMANTIC BOUNDARY DETECTION SYSTEM

(71) Applicant: Mitsubishi Electric Research Laboratories, Inc., Cambridge, MA (US)

(72) Inventors: Chen Feng, Cambridge, MA (US); Zhiding Yu, Cambridge, MA (US); Srikumar Ramalingam, Salt Lake City, UT (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 57 days.

(21) Appl. No.: 15/718,554

(22) Filed: Sep. 28, 2017

(65) Prior Publication Data

US 2018/0336683 A1 Nov. 22, 2018

Related U.S. Application Data

(60) Provisional application No. 62/507,922, filed on May 18, 2017.

(51) Int. Cl.
*G06T 7/00* (2017.01)
*G06T 7/13* (2017.01)
(Continued)

(52) U.S. Cl.
CPC ............... *G06T 7/13* (2017.01); *G06K 9/03* (2013.01); *G06K 9/4604* (2013.01); *G06K 9/628* (2013.01);
(Continued)

(58) Field of Classification Search
None
See application file for complete search history.

(56) References Cited

U.S. PATENT DOCUMENTS 9,053,537 B2 6/2015 Stein et al.
9,576,201 B2 2/2017 Wu et al.
(Continued)

FOREIGN PATENT DOCUMENTS

EP 3171297 A1 * 5/2017

OTHER PUBLICATIONS

Stephen Gould, Yuhang Zhang. "PatchMatchGraph: Building a Graph of Dense Patch Correspondences for Label Transfer." Jul. 30, 2012, Research School of Computer Science, Anu, Australia.
(Continued)

*Primary Examiner* — Delomia L Gilliard
(74) *Attorney, Agent, or Firm* — Gennadiy Vinokur; James McAleenan; Hironori Tsukamoto

(57) ABSTRACT

A image processing system for multi-label semantic edge detection in an image includes an image interface to receive an image of a scene including at least one object, a memory to store a neural network trained for performing a multi-label edge classification of input images assigning each pixel of edges of objects in the input images into one or multiple semantic classes, a processor to transform the image into a multi-label edge-map using the neural network detecting an edge of the object in the image and assigning multiple semantic labels to at least some pixels forming the edge, and an output interface to render the multi-label edge-map.

16 Claims, 10 Drawing Sheets

(51) Int. Cl.
*G06K 9/62* (2006.01)
*G06N 3/08* (2006.01)
*G06T 7/12* (2017.01)
*G06N 3/04* (2006.01)
*G06K 9/03* (2006.01)
*G06K 9/46* (2006.01)

(52) U.S. Cl.
CPC .......... *G06K 9/6259* (2013.01); *G06N 3/04* (2013.01); *G06N 3/08* (2013.01); *G06T 7/12* (2017.01)

(56) References Cited

U.S. PATENT DOCUMENTS

| | | | |
|---|---|---|---|
| 2014/0067735 A1* | 3/2014 | Yu | G06N 3/02 706/20 |
| 2007/0076438 A1 | 3/2017 | Kottenstette et al. | |
| 2017/0169313 A1* | 6/2017 | Choi | G06K 9/6267 |
| 2017/0262735 A1* | 9/2017 | Ros Sanchez | G06K 9/6256 |
| 2018/0025257 A1* | 1/2018 | van den Oord | H04N 19/50 375/240.14 |
| 2018/0032846 A1* | 2/2018 | Yang | G06K 9/00711 |

OTHER PUBLICATIONS

Holger Caesar, Jasper Uijlings, Vittorio Ferrari. "Joint Calibration for Semantic Segmentation." (Submitted on Jul. 6, 2015 (v1), last revised Aug. 12, 2015 (this version, v4). Computer Vision and Pattern Recognition (cs.CV).

* cited by examiner

| Metric | Category | Method | aero | bike | bird | boat | bottle | bus | car | cat | chair | cow | table |
|---|---|---|---|---|---|---|---|---|---|---|---|---|---|
| MF (ODS) | Baseline | InvDet | 41.5 | 46.7 | 15.6 | 17.1 | 36.5 | 42.6 | 40.3 | 22.7 | 18.9 | 26.9 | 12.5 |
| | | HFL-FC8 | 71.6 | 59.6 | 68.0 | 54.1 | 57.2 | 68.0 | 58.8 | 69.3 | 43.3 | 65.8 | 33.3 |
| | | HFL-CRF | 73.9 | 61.4 | 74.6 | 57.2 | 58.8 | 70.4 | 61.6 | 71.9 | 46.5 | 72.3 | 36.2 |
| | VGG | Basic-Softmax | 67.6 | 55.3 | 50.4 | 44.9 | 42.3 | 64.6 | 61.0 | 63.9 | 37.4 | 43.1 | 25.3 |
| | | Basic | 70.0 | 58.6 | 62.5 | 50.2 | 51.2 | 65.4 | 60.6 | 66.9 | 39.7 | 47.3 | 31.0 |
| | | CASENet | 72.5 | 61.5 | 63.8 | 54.5 | 52.3 | 65.4 | 62.6 | 67.2 | 42.6 | 51.8 | 31.4 |
| | ResNet | Basic-Softmax | 74.0 | 64.1 | 64.8 | 52.5 | 52.1 | 73.2 | 68.1 | 73.2 | 43.1 | 56.2 | 37.3 |
| | | Basic | 82.5 | 74.2 | 80.2 | 62.3 | 68.0 | 80.8 | 74.3 | 82.9 | 52.9 | 73.1 | 46.1 |
| | | DSN | 81.6 | 75.6 | 78.4 | 61.3 | 67.6 | 82.3 | 74.6 | 82.6 | 52.4 | 71.9 | 45.9 |
| | | CASENet- | 83.0 | 74.7 | 79.6 | 61.5 | 67.7 | 80.7 | 74.1 | 82.8 | 53.3 | 75.0 | 44.5 |
| | | CASENet | 83.3 | 76.0 | 80.7 | 63.4 | 69.2 | 81.3 | 74.9 | 83.2 | 54.3 | 74.8 | 46.4 |

| Metric | Category | Method | dog | horse | mbike | person | plant | sheep | sofa | train | tv | mean |
|---|---|---|---|---|---|---|---|---|---|---|---|---|
| MF (ODS) | Baseline | InvDet | 18.2 | 35.4 | 29.4 | 48.2 | 13.9 | 26.9 | 11.1 | 21.9 | 31.4 | 27.9 |
| | | HFL-FC8 | 67.9 | 67.5 | 62.2 | 69.0 | 43.8 | 68.5 | 33.9 | 57.7 | 54.8 | 58.7 |
| | | HFL-CRF | 71.1 | 73.0 | 68.1 | 70.3 | 44.4 | 73.2 | 42.6 | 62.4 | 60.1 | 62.5 |
| | VGG | Basic-Softmax | 57.9 | 57.1 | 60.0 | 72.0 | 33.0 | 53.5 | 30.9 | 54.4 | 47.7 | 51.1 |
| | | Basic | 60.1 | 59.4 | 60.2 | 74.4 | 38.0 | 56.0 | 35.9 | 60.0 | 53.8 | 55.1 |
| | | CASENet | 62.0 | 61.9 | 62.8 | 75.4 | 41.7 | 59.8 | 35.8 | 59.7 | 50.7 | 56.8 |
| | ResNet | Basic-Softmax | 67.4 | 68.4 | 67.6 | 76.7 | 42.7 | 64.3 | 37.5 | 64.6 | 56.3 | 60.2 |
| | | Basic | 79.6 | 78.9 | 76.0 | 80.4 | 52.4 | 75.4 | 48.6 | 75.8 | 68.0 | 70.6 |
| | | DSN | 79.2 | 78.3 | 76.2 | 80.1 | 51.9 | 74.9 | 48.0 | 76.5 | 66.8 | 70.3 |
| | | CASENet- | 79.8 | 80.4 | 76.2 | 80.2 | 53.2 | 77.3 | 47.7 | 75.6 | 66.3 | 70.7 |
| | | CASENet | 80.3 | 80.2 | 76.6 | 80.8 | 53.3 | 77.2 | 50.1 | 75.9 | 66.8 | 71.4 |

FIG. 6

| Metric | Method | road | sidewalk | building | wall | fence | pole | traffic lgt | traffic sign | vegetation |
|---|---|---|---|---|---|---|---|---|---|---|
| MF (ODS) | DSN | 85.4 | 76.4 | 82.6 | 51.8 | 56.5 | 66.5 | 62.6 | 72.1 | 80.6 |
|  | CASENet | 86.6 | 78.8 | 85.1 | 51.5 | 58.0 | 70.1 | 70.8 | 74.6 | 83.5 |
| AP | DSN | 78.0 | 76.0 | 83.9 | 47.9 | 53.1 | 67.9 | 57.9 | 75.9 | 79.9 |
|  | CASENet | 77.7 | 78.6 | 87.6 | 49.0 | 56.9 | 72.8 | 70.3 | 78.9 | 85.1 |

| Metric | Method | terrain | sky | person | rider | car | truck | bus | train | motorcycle | bike | mean |
|---|---|---|---|---|---|---|---|---|---|---|---|---|
| MF (ODS) | DSN | 61.1 | 76.0 | 77.5 | 66.3 | 84.5 | 52.3 | 67.3 | 49.4 | 56.0 | 76.0 | 68.5 |
|  | CASENet | 62.9 | 79.4 | 81.5 | 71.3 | 86.9 | 56.0 | 69.5 | 52.0 | 61.3 | 80.2 | 71.3 |
| AP | DSN | 60.2 | 75.0 | 75.4 | 61.0 | 85.8 | 50.6 | 67.8 | 42.5 | 51.4 | 72.0 | 66.4 |
|  | CASENet | 63.1 | 78.4 | 83.0 | 70.1 | 80.5 | 46.9 | 70.0 | 48.8 | 58.6 | 78.9 | 70.8 |

FIG. 7

MULTI-LABEL SEMANTIC BOUNDARY DETECTION SYSTEM

FIELD OF THE INVENTION

The present invention is generally related to computer vision, and more particularly to detecting the boundaries of different object classes in an image.

BACKGROUND OF THE INVENTION

Both high-level and low-level computer vision problems such as semantic image segmentation or depth estimation often involve assigning a label to each pixel in an image. While the feature representation used to classify individual pixels plays an important role in this task, it is similarly important to consider factors such as image edges, appearance consistency and spatial consistency while assigning labels in order to obtain accurate and precise results. It is not a surprise that several computer-vision tasks can be beneficially used together or even merged into one joint task.

For example, the semantic segmentation aims to predict a category label for every pixel in the image, while boundaries or edge detection aims to determine boundary pixels in the images that are highly beneficial in improving a wide variety of vision tasks including the semantic segmentation. To that end, those two problems can be merged together into category-aware semantic boundary detection as a separate problem in computer vision. However, while classical boundary detection is a challenging binary problem in itself, the semantic boundary detection by nature is an even more challenging problem.

Recently, the problem of boundary detection has been addressed with deep learning, and some neural networks directly combine semantic segmentation results and edge detection results to perform the semantic boundary detection, instead of more systematically combining the network architectures.

Thus, such a combination of semantic segmentation and edge detection is not always efficient due to the requirement of multiple neural networks.

SUMMARY OF THE INVENTION

Some embodiments provide a system and a method for semantic boundary detection of an image. The present invention is based on recognition regarding semantic segmentation of an image where every pixel is classified into different object classes such as buildings, sky, ground, pedestrians, cars, etc. In the present disclosure, we focus on the boundary pixels and label them in a manner such that we obtain the critical information about the objects and their boundaries.

Some embodiments are based on understanding that in the semantic segmentations, each pixel of the image belongs only to a single class, resulting in so called multi-class segmentation. This assumption is fundamental for regular semantic segmentation, but is not necessarily correct for category-aware semantic boundary detection. Such an incorrect assumption precludes the proper and better training and testing of the neural networks that perform semantic boundary detection as a dual problem of semantic segmentations.

Specifically, in theory, all objects are distinct and separate from each other. However, some embodiments are based on realization that in practice, at least due to limitations of the sensor resolution, an edge pixel can belong to multiple objects and/or classes. To that end, some embodiments allow the pixels forming boundaries of the objects to belong to one or multiple semantic classes. In such a manner, some embodiments transform multi-class segmentation wherein each pixel belongs to only one semantic class into a multi-label segmentation wherein each pixel can belong to one or multiple semantic classes, i.e., being assigned to one or multiple semantic labels. Examples of assignments to multiple semantic labels can include assignments such as "building+pole" and "road+sidewalk".

Some embodiments are based on realization that by allowing such a multi-label classification during the training and testing of the neural network relaxes constraints of the multi-class classification constraining each pixel to have only one semantic label and thereby increases classification accuracy. The product of such a multi-label edge segmentation of an image is referred herein as a multi-label edge-map of the image.

To that end, some embodiments transform the image into a multi-label edge-map using the neural network detecting an edge of the object in the image and assigning multiple semantic labels to at least some pixels forming the edge. For example, some embodiments train a neural network for performing a multi-label edge classification of input images by assigning each pixel of edges of objects in the input images into one or multiple semantic classes because the edges are formed by objects belonging to those classes. In some implementations, during the training, a multi-label edge classification is enforced by having multi-label edge-map of the training images, i.e., ground truth class label images manually created containing K-channel for each of the K semantic classes, and by applying the loss function that independently determines classification errors for each semantic class.

Accordingly, one embodiment discloses an image processing system including an image interface to receive an image of a scene including at least one object; a memory to store a neural network trained for performing a multi-label edge classification of input images assigning each pixel of edges of objects in the input images into one or multiple semantic classes; a processor to transform the image into a multi-label edge-map using the neural network detecting an edge of the object in the image and assigning multiple semantic labels to at least some pixels forming the edge; and an output interface to render the multi-label edge-map, such as using colors to represent different combinations of class labels.

Another embodiment discloses a method for a multi-label semantic edge detection in an image, wherein the method uses a processor coupled to a memory storing a neural network trained for performing a multi-label edge classification of input images assigning each pixel of edges of objects in the input images into one or multiple semantic classes, wherein the processor is coupled with stored instructions implementing the method, wherein the instructions, when executed by the processor carry out at least some steps of the method, including receiving an image of a scene including at least one object; transforming the image into a multi-label edge-map using the neural network detecting an edge of the object in the image and assigning multiple semantic labels to at least some pixels forming the edge; and rendering the multi-label edge-map.

Yet another embodiment discloses a non-transitory computer readable storage medium storing a neural network trained for performing a multi-label edge classification of input images assigning each pixel of edges of objects in the input images into one or multiple semantic classes and embodied thereon a program executable by a processor for performing a method, the method including transforming, in response to receiving an image of a scene including at least one object, the image into a multi-label edge-map using the neural network detecting an edge of the object in the image and assigning multiple semantic labels to at least some pixels forming the edge; and rendering the multi-label edge-map.

Some embodiments are based on another realization that in contrast with multi-class segmentation where deep supervision with the loss function is critical at the early layers, for the multi-label semantic boundary detection, the deep supervision is not necessary at the early layers. Specifically, the multi-label segmentation depends on contextual information considered by the layers of the neural network. In turn, the contextual information depends on the field of view of the layers (or the field of view of the inputs to the layers) that in turn is the function of the receptive fields of the layers. To that end, some embodiments perform the multi-label classification supervision, i.e., loss calculation, only in upper layers where the receptive field size is large.

For example, in one embodiment, the neural network includes a set of layers for sequentially processing the input images, wherein the loss function is imposed on only a subset of layers with receptive field greater than a threshold. This embodiment takes advantage of higher-level contextual information while avoiding the risk to overly fine-tune the lower layers for class agnostic boundary prediction and disturb extracting higher-level context information.

However, some embodiments are based on another realization that although the lower level features with low receptive field are optional for multi-label classification, those lower level features can be helpful in suppressing responses from non-boundary pixels and can be jointly considered with higher level context information for the final multi-label classification. To that end, in some embodiments, the neural networks combines outputs of at least some early layers of the neural network that have small receptive field into a tensor and performs the multi-label edge classification on the tensor.

In various embodiments, the neural network is implemented differently. For example, in one embodiment, the neural network is a residual neural network (sometimes referred to as ResNet). This embodiment is based on recognition that modeling the non-linear mapping of the input and output images is more difficult than modeling the residuals of such a mapping allowing to increase a number of layers.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6. is a table indicating simulation results on the SBD benchmark; and

FIG. 7. is a table indicating simulation results on the Cityscape benchmark.

DETAILED DESCRIPTION OF THE PREFERRED EMBODIMENTS

Figure 1A:
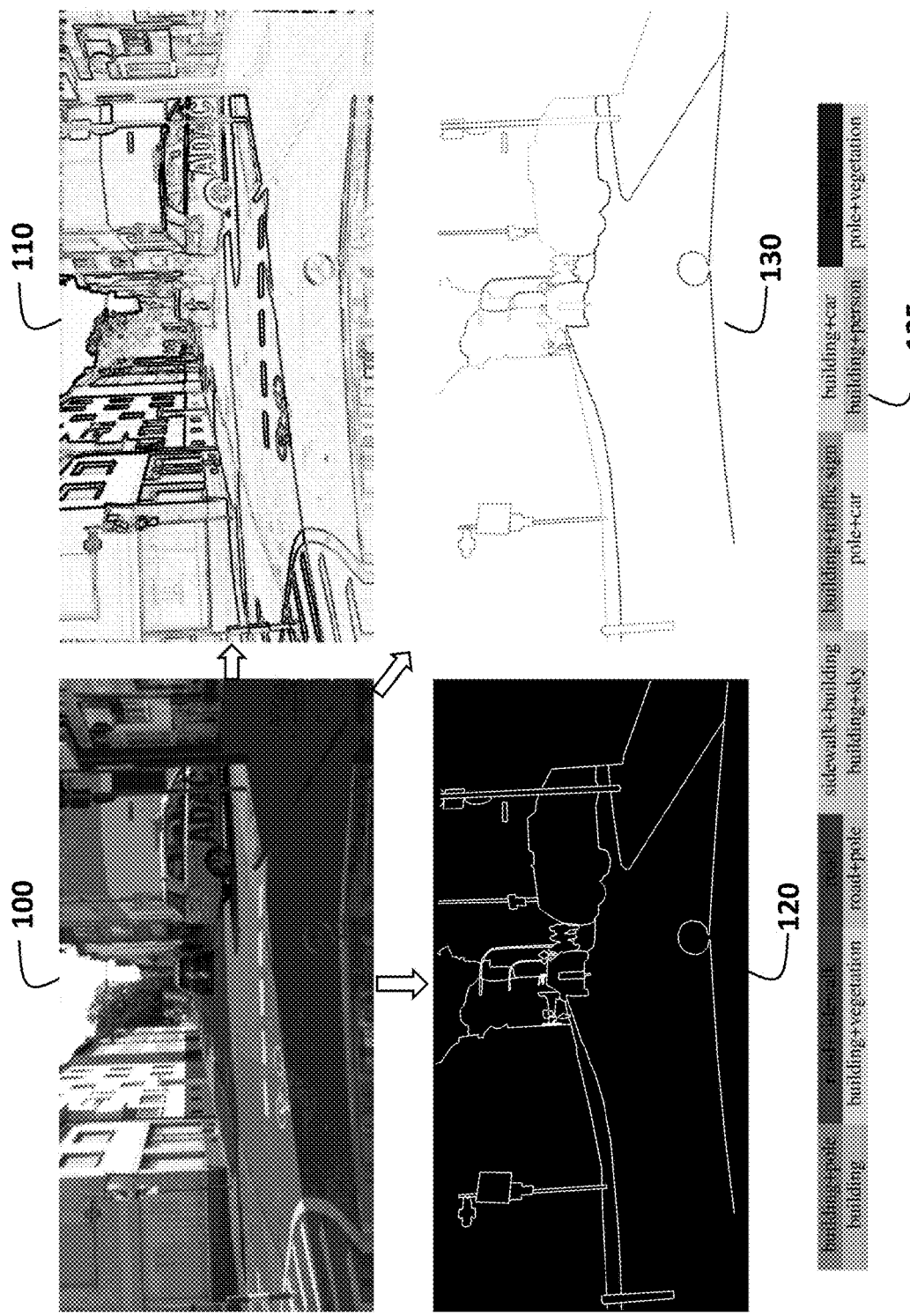
FIG. 1A shows schematic illustrations indicating differences between conventional edge, semantic edge, and category-aware semantic edge, according to embodiments of the present disclosure.

Various embodiments of the present disclosure are described hereafter with reference to the figures. It would be noted that the figures are not drawn to scale elements of similar structures or functions are represented by like reference numerals throughout the figures. It should be also noted that the figures are only intended to facilitate the description of specific embodiments of the disclosure. They are not intended as an exhaustive description of the disclosure or as a limitation on the scope of the disclosure. In addition, an aspect described in conjunction with a particular embodiment of the disclosure is not necessarily limited to that embodiment and can be practiced in any other embodiments of the disclosure.

FIG. 1A shows schematic illustrations indicating differences between conventional edge, semantic edge, and category-aware semantic edge, according to embodiments of the present disclosure.

Given an image of a typical road scene 100, traditional low-level edge detection methods such as Canny edge detector will output a low-level edge map 110 that contains edges formed by both illumination, texture, occlusion, etc. Semantic edge detection methods such as the Holistically-nested edge detection (HED) method will output an edge map 120 that contains edges formed by semantic objects occluding or intersecting with each other. Our goal is to not only detect object boundary pixels but also classify each boundary pixel based on its association to one or more semantic classes, resulting in an edge map 130 that contains boundary information together with its semantic class information. While semantic classes typically refer to single object categories such as sky, building, and ground, boundary classes are associated with two or more semantic classes.

For example, a boundary pixel can be denoted by sky and building if it lies on the contour separating these two regions. The image 130 and can be color coded by HSV, where hue represents boundaries of different combination of categories (color codes of 14 combinations are shown in the table 135), and Saturation represents the strength of association to a certain boundary. We propose a novel convolutional neural network (CNN) architecture that we refer to as Category-Aware Semantic Edge Network (CASENet). Our method outperforms other competing ones by a large margin. Best viewed in color.

FIG. 1A shows an image 100 of a road scene from Cityscapes dataset with several object categories such as building, ground, sky, and car. While many existing methods in vision focus on dense semantic segmentation where each pixel is classified as one of these object categories, this invention focuses on only the boundary pixels. In particular, we study the problem of classifying each boundary pixel based on its association to one or more of the object categories. For example, a boundary pixel lying on the contour separating building and pole can be associated with both of these object categories. Typically, boundary categories include labels such as "building+pole" and "road+ sidewalk" as shown in the figure.

More precisely, every boundary pixel is denoted by a vector whose individual elements denote the strength of pixel's association with different semantic classes. In most cases, each boundary pixel will be associated with only two object categories. However, in the case of junctions, we may expect the boundary pixel to be associated with more than two object categories. Hence, we do not restrict the number of object categories a boundary pixel can be associated with in this case. In an image 130, we show that our semantic boundary labeling result in Hue-Saturation-Value (HSV) format, where the Hue represents different types of boundaries and the Saturation represents the association of a pixel to a specific boundary class. We treat boundary as a set of edge pixels, not necessarily forming a continuous curve. On the other hand, contours can be seen as open curves without necessarily enclosing any regions. The problem of boundary detection has been shown to be useful for many vision tasks such as semantic segmentation, object detection/recognition, and 3D reconstruction. This is not all that surprising since we are used to seeing boundary localization difficulties in many problems such as segmentation and stereo.

The common misunderstanding is to treat boundary information as just low-level and simple cues to enhance other applications. With a little extrapolation, it is not difficult to see that a near-perfect semantic boundary, without any additional information, can solve semantic segmentation, depth estimation, image-based localization, and object detection. It is hard to perceive boundary detection in this manner because it is a difficult problem itself. However, the availability of large training data for this task and the progress in deep learning methods have allowed us to make significant progress for the boundary detection problem in the last few years. In particular, there have been newer data sets. The availability of large-scale semantic segmentation data sets can also be easily processed to obtain semantic boundary data set as these two problems can be seen as dual problems. One may ask: is semantic segmentation and boundary detection sufficient for holistic interpretation of natural images? We believe that such a complete understanding is not complete without interpreting the image using semantic contours and junctions. However, we believe that it is important to improve the accuracy of semantic boundary detection to a certain level for moving towards a holistic interpretation.

Figure 1B:
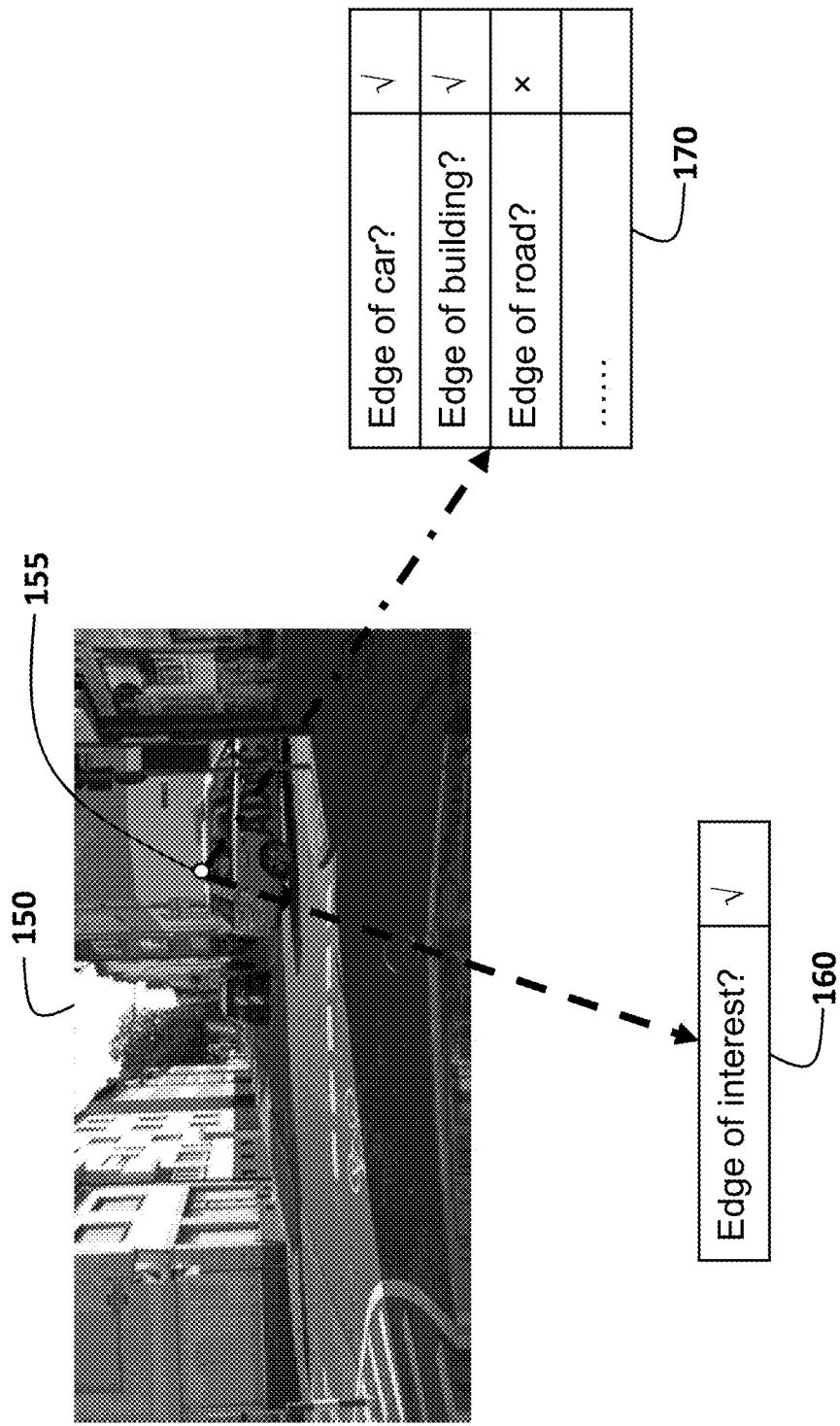
FIG. 1B shows a diagram indicating differences between single-label semantic edge and category-aware semantic edge, according to embodiments of the present disclosure.

FIG. 1B shows a diagram indicating differences between single-label semantic edge 160 of a pixel 155 in an input image 150 that is used in conventional semantic edge detection in the edge map 120 and category-aware semantic edge 170 of the pixel 155 that is used in category-aware semantic edge detection in the edge map 130, according to embodiments of the present disclosure.

Figure 2:
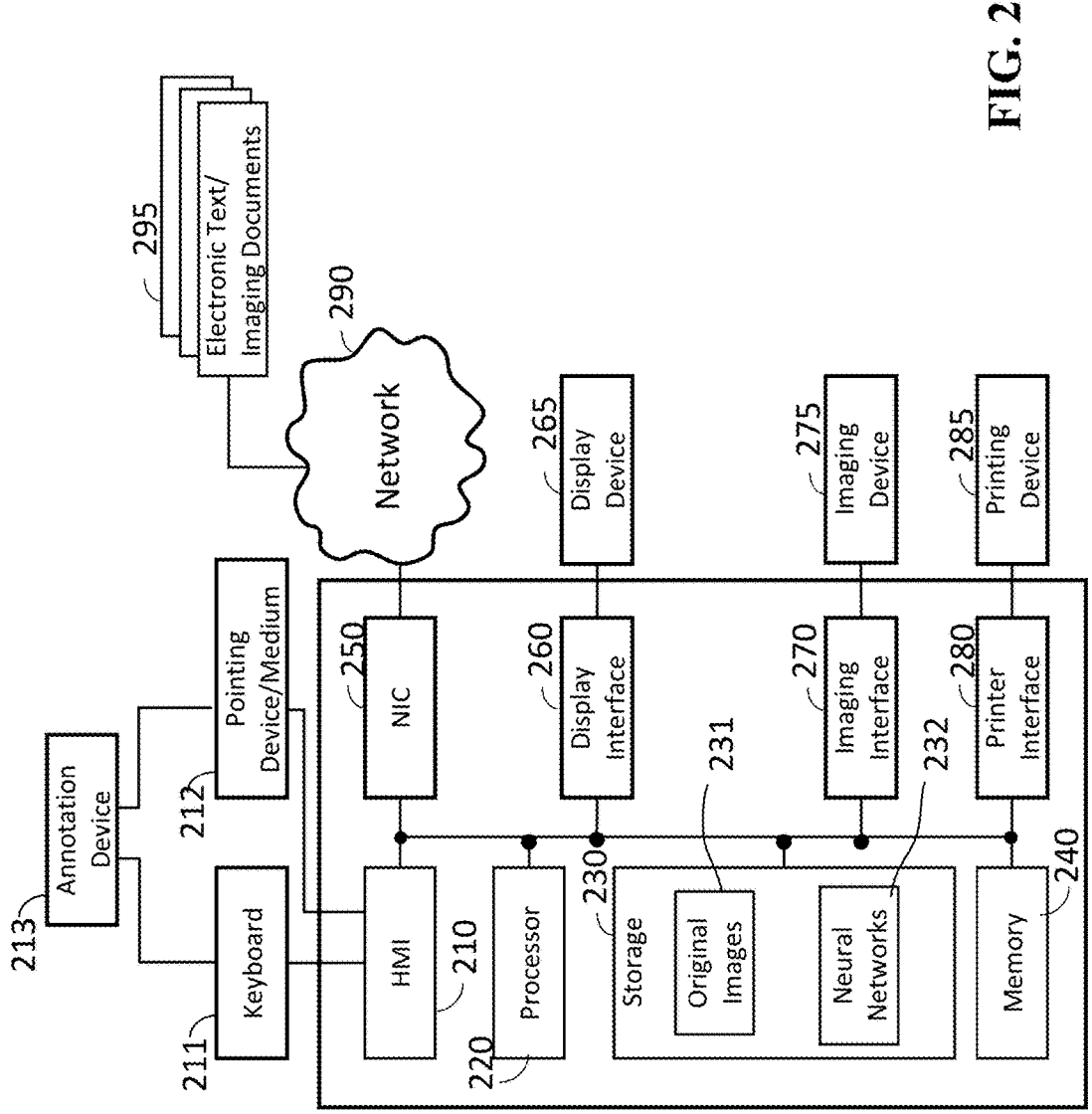
FIG. 2 is a block diagram illustrating an image processing system for performing multi-label semantic edge detection in an image, according to embodiments of the present disclosure.

FIG. 2 is a block diagram illustrating an image processing system 200 for performing multi-label semantic edge detection in an image, according to embodiments of the present disclosure.

The image processing system 200 may include a human machine interface (HMI) with input/output (I/O) interface 210 connectable with a keyboard 211, a pointing device/ medium 212 and an annotation device 213.

Further, the image processing system 200 may include a global positioning system (GPS) (not shown), a processor 220, a storage device 230, one or more memories 240, a network interface controller 250 (NIC) connectable with other computers/terminals 295 via a network 290 including local area networks, wireless networks (not shown) and internet network (not shown), a display interface 260 connected to a display device 265, an imaging interface 270 connectable with an imaging device 275 for receiving an image, a printer interface 280 connectable with a printing device 285. The storage device 230 may store a set of original images 231 and one or more neural networks 232. The program codes of the neural networks 232 can be stored into a non-transit computer readable medium (not shown) connectable with the HMI 210. Further, the HMI 210, the NIC 250 and the imaging interface 270 are configured to receive an image of a scene including objects via a data input device (not shown) from outside of the system using the network, a wireless network or direct connections with the data input device, and transform the image into transfer the image to an input image that can be processed by the neural networks 232 in the system 200.

Discussion will be made below to address problems and methods regarding the image processing system for performing multi-label semantic edge detection in an image.

The definition of boundary or edge detection has evolved over time from low-level to high-level features: simple edge filters, depth edges, object boundaries, and semantic contours. In some sense, the evolution of edge detection algorithms captures the progress in computer vision from simple convolutional filters.

Depth Edges

Some previous work focuses on labeling contours into convex, concave, and occluding ones from synthetic line drawings and real world images under restricted settings. Indoor layout estimation can also be seen as the identification of concave boundaries (lines folding walls, ceilings, and ground). By recovering occluding boundaries, it was shown that the depth ordering of different layers in the scene can be obtained.

Perceptual Edges

A wide variety of methods are driven towards the extraction of perceptual boundaries. It is possible to use boosted decision trees on different patches to extract edge maps. It is also possible to compute sketch tokens which are object boundary patches using random forests. Several other edge detection methods can include statistical edges, multi-scale boundary detection, and point-wise mutual information (PMI) detector. Another approach can be a real time fast edge detection method using structured random forests. In other methods, using deep neural networks can push the detection performance to state-of-the-art.

Semantic Edges

The origin of semantic edge detection can be possibly pinpointed. As a high level task, it has also been used implicitly or explicitly in many problems related to segmentation and reconstruction. In some sense, all semantic segmentation methods can be loosely seen as semantic edge detection since one can easily obtain edges, although not necessarily an accurate one, from the segmentation results. There may be approaches that specifically formulate the problem statement as binary or category-aware semantic edge detection. It may introduce the Semantic Boundaries Dataset (SBD) and proposed inverse detector which combines both bottom-up edge and top-down detector information to detect category-aware semantic edges. HFL (High-for-Low) (Bertasius et al, 2015) first uses VGG network (Simonyan and Zisserman, 2014) to locate binary semantic edge sand then uses deep semantic segmentation networks such as FCN (fully convolutional network) and DeepLab to obtain category labels. The framework, however, is not end-to-end trainable due to the separated prediction process.

DNNs for Edge Detection

Deep neural networks can be used for edge detection. One notable method may be the holistically-nested edge detection (HED) which trains and predicts edges in an image-to-image fashion and performs end-to-end training.

Problem Formulation

Given an input image (e.g., 300 in FIG. 3A, 400 in FIG. 4A, or 500 in $\{Y_1, \ldots, Y_K\}$, FIG. 5A), our goal is to compute the semantic edge maps corresponding to predefined categories. More formally, for an input image I and K defined semantic categories, we are interested in obtaining K edge maps each having the same size as I. With a network having the parameters W, we denote $Y_k(p|I;W) \in [0; 1]$ as the network output indicating the computed edge probability on the k-th semantic category at pixel p.

Multi-Label Loss Function

Possibly driven by the multi-class nature of semantic segmentation, several related works on category-aware semantic edge detection have more or less looked into the problem from the multi-class learning perspective. Our intuition is that this problem by nature should allow one pixel belonging to multiple categories simultaneously, and should be addressed by a multi-label learning framework.

We therefore propose a multi-label loss. Suppose each image I has a set of label images $\{\bar{Y}_1, \ldots, \bar{Y}_K\}$, where $\bar{Y}_k$ is a binary image indicating the ground truth of the k-th class semantic edge. The multi-label loss is formulated as:

$$\mathcal{L}(W) = \sum_k \mathcal{L}_k(W) \qquad (1)$$
$$= \sum_k \sum_p \{-\beta \hat{Y}_k(p) \log Y_k(p|I;W) -$$
$$(1-\beta)(1-\hat{Y}_k(p)) \log(1-Y_k(p|I;W))\},$$

where β is the percentage of non-edge pixels in the image to account for skewness of sample number.

Network Architecture

We propose CASENet, an end-to-end trainable convolutional neural network (CNN) architecture (shown in FIG. 5A) to address category-aware semantic edge detection. Before describing CASENet, we first propose two alternative network architectures which one may be given on edge detection and semantic segmentation. Although both architectures can also address our task, we will analyze issues associated with them, and address these issues by proposing the CASENet architecture.

Basic Networks

Figure 3B:
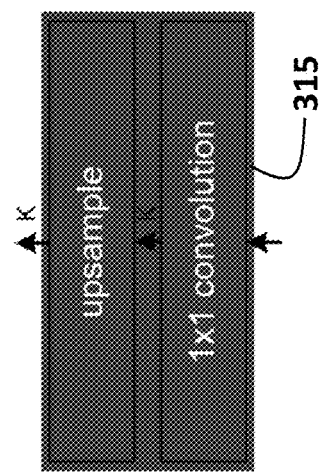
FIG. 3B is a block diagram illustrating a module used in the CNN of FIG. 3A, according to embodiments of the present disclosure.
Figure 3A:
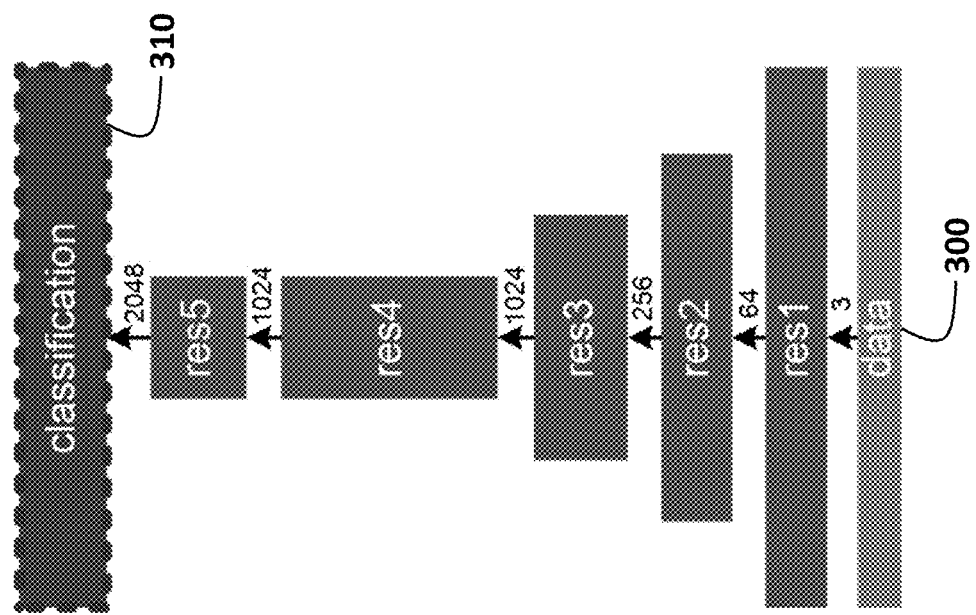
FIG. 3A is a block diagram illustrating an architecture of a convolutional neural network (CNN) for multi-label semantic edge training, according to embodiments of the present disclosure.

FIG. 3A is a block diagram illustrating basic architecture of a convolutional neural network (CNN) for multi-label semantic edge training, according to embodiments of the present disclosure. In this case, input data are introduced at a layer 300 using an interface, e.g. the imaging interface 270, the HMI 210 or the NIC 250, and processed through blocks of res1, res2, res 3, res4 and res5, and classified at a classification block 310. Each of the blocks may be referred to as a layer. FIG. 3B is also a block diagram illustrating a module 315 having a 1×1 convolution and an upsample layer used in the CNN of FIG. 3A, according to embodiments of the present disclosure.

We address the edge detection problem under the fully convolutional network framework. We adopt ResNet-101 by removing the original average pooling and fully connected layer, and keep the bottom convolution blocks. We further modify the base network in order to better preserve low-level edge information. We change the stride of the first and fifth convolution blocks ("res1" and "res5" in FIG. 3A) in ResNet-101 from 2 to 1. In some cases, ResNet can be referred to as a residual neural network that has connections linking early layers directly to later layers, skipping intermediate connections between sequential layers. We also introduce dilation factors to subsequent convolution layers to maintain the same receptive field sizes as the original ResNet.

Basic Architecture

A very natural architecture may be the Basic architecture shown in FIG. 3A. On top of the base network, we add a classification module (FIG. 3B) as a 1×1 convolution layer, followed by bilinear up-sampling (implemented by a K-grouped deconvolution layer) to produce a set of K activation maps $\{A1, \ldots, AK\}$, each having the same size as the image. We then model the probability of a pixel belonging to the k-th class edge using the sigmoid unit given by Yk(p)=σ(Ak(p)), which is presented in the Eq. (1). Note that Yk(p) is not mutually exclusive.

Deeply Supervised Networks

Figure 4A:
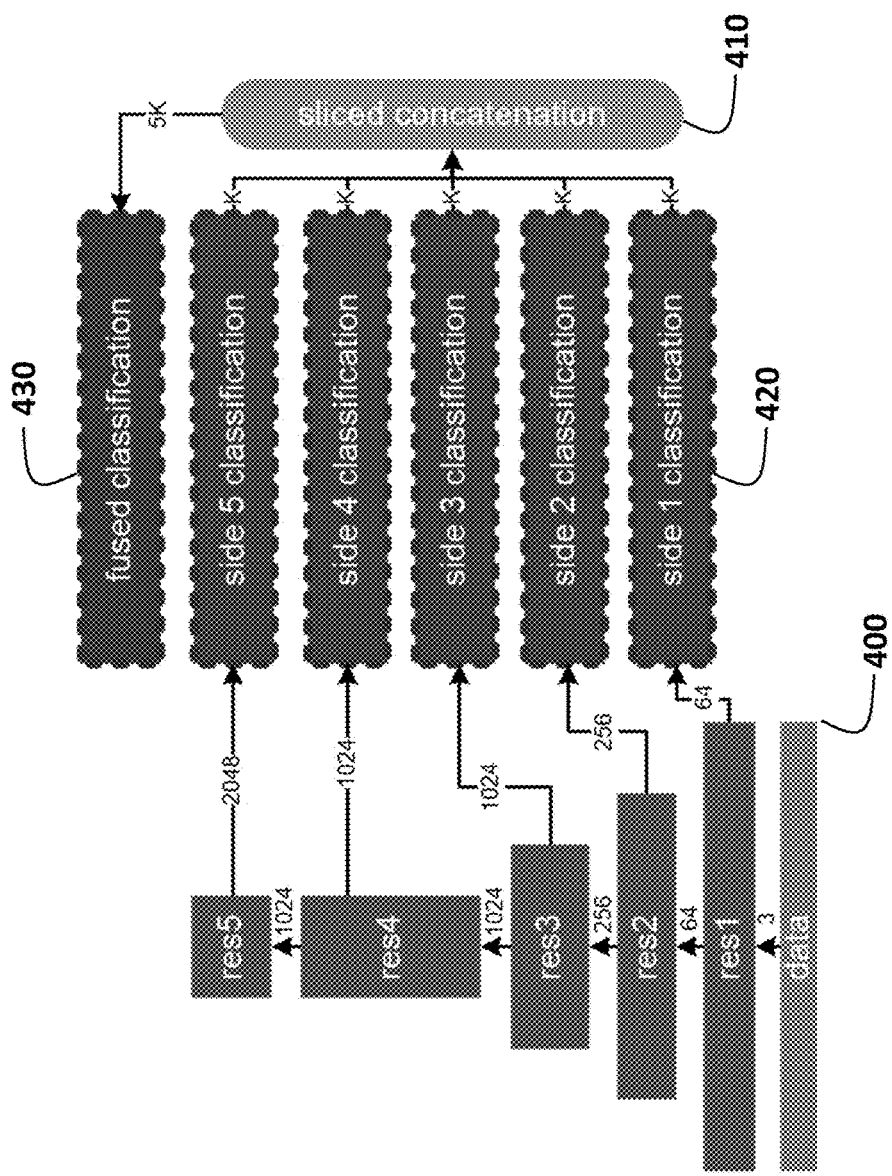
FIG. 4A. is a block diagram illustrating an architecture of a deeply supervised network (DSN) architecture for multi-label semantic edge training, according to embodiments of the present disclosure.
Figure 4C:
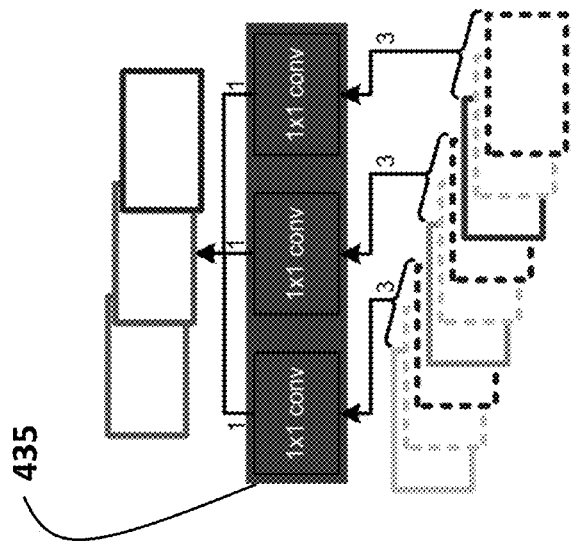
FIG. 4C is a block diagram illustrating a module using a fused classification used in the DSN of FIG. 4A, according to embodiments of the present disclosure.
Figure 4B:
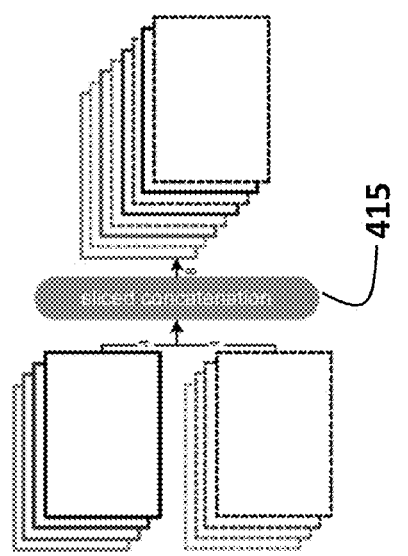
FIG. 4B is a block diagram illustrating a module using a sliced concatenation used in the DSN of FIG. 4A, according to embodiments of the present disclosure.

FIG. 4A. is a block diagram illustrating an architecture of a deeply supervised network (DSN) architecture for multi-label semantic edge training, according to embodiments of the present disclosure. FIG. 4B is a block diagram illustrating a module using a sliced concatenation used in the DSN of FIG. 4A, according to embodiments of the present disclosure. FIG. 4C is a block diagram illustrating a module using a fused classification used in the DSN of FIG. 4A, according to embodiments of the present disclosure.

One of the distinguishing features of the holistically nested edge detection (HED) network is the nested architecture with deep supervision. The basic idea is to impose losses to bottom convolution sides besides the top network loss. In addition, a fused edge map is obtained by supervising the linear combination of side activations. Note that HED only performs binary edge detection. We extended this architecture to handle K channels for side outputs and K channels for the final output. We refer to this as deeply supervised network (DSN), as depicted in FIG. 4A. In this network, we connect an above-mentioned classification module to the output of each stack of residual blocks, producing 5 side classification activation maps $\{A^{(1)}, \ldots, A^{(5)}\}$, where each of them has K-channels. We then fuse these 5 activation maps through a sliced concatenation layer (410 in FIG. 4A and 415 in FIG. 4B) to produce a 5K-channel activation map:

$$A^f = \{A_1^{(1)}, \ldots, A_1^{(5)}, A_2^{(1)}, \ldots, A_2^{(5)}, \ldots, A_K^{(5)}\} \quad (2)$$

$A^f$ is fed in to our fused classification layer which performs K-grouped 1×1 convolution (435 in FIG. 4C and 430 in FIG. 4A) to produce a K-channel activation map $A^{(6)}$. Finally, 6 loss functions are computed on $\{A^{(1)}, \ldots, A^{(6)}\}$ using the Equation 1 to provide deep supervision to this network.

Note that the reason we perform sliced concatenation in conjunction with grouped convolution instead of the corresponding conventional operations is as follows. Since the 5 side activations are supervised, we implicitly constrain each channel of those side activations to carry information that is most relevant to the corresponding class. With sliced concatenation and grouped convolution, the fused activation for a pixel p is given by:

$$A_k^{(6)}(p) = W_k^T [A_k^{(1)}(p)^T, \ldots, A_k^{(5)}(p)^T] \quad (3)$$

This essentially integrates corresponding class-specific activations from different scales as the finally fused activations. Our experiments empirically support this design choice.

Figure 5A:
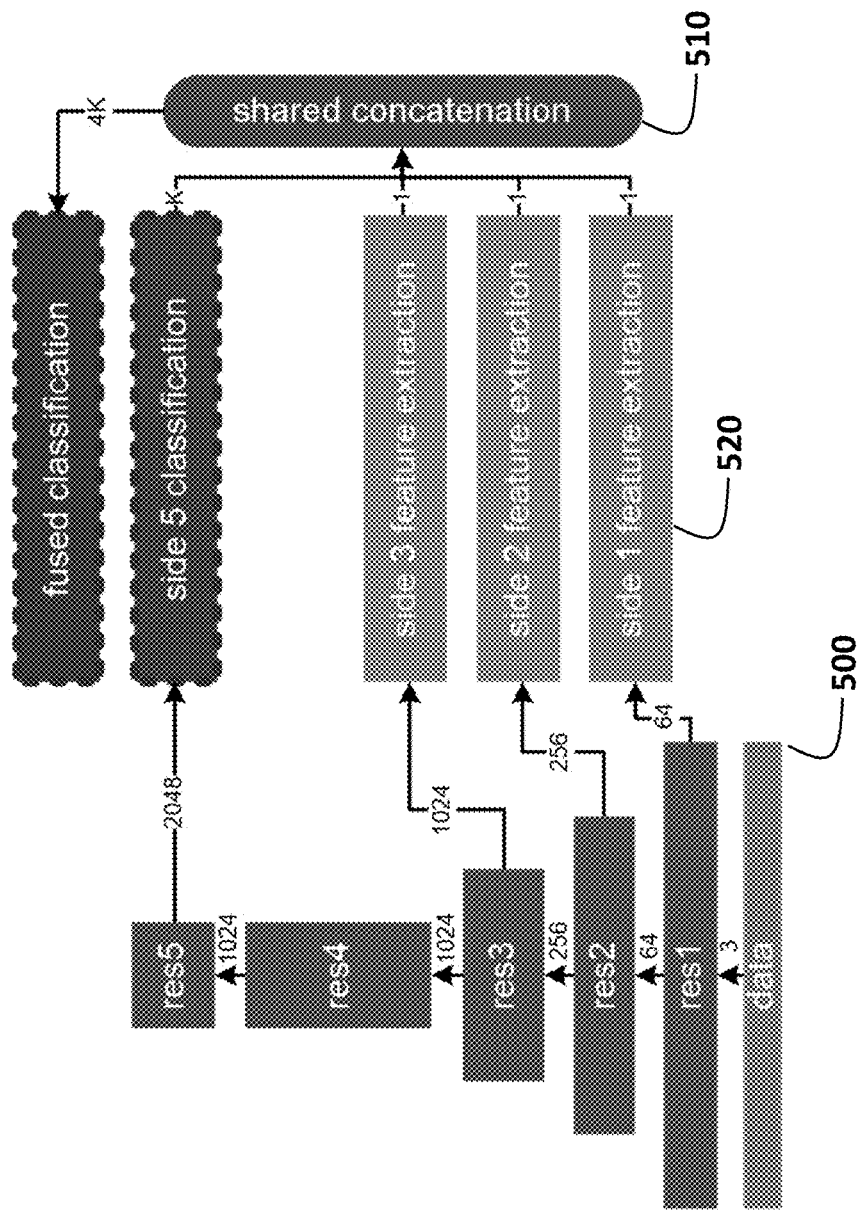
FIG. 5A is a block diagram illustrating an architecture of a category-aware semantic edge detection network (CASENet), according to embodiments of the present disclosure.
Figure 5C:
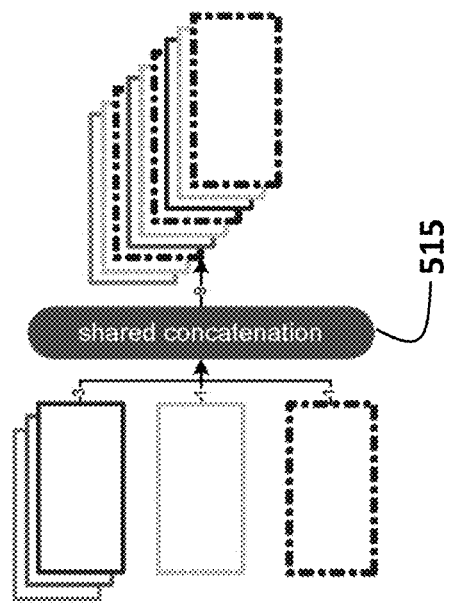
FIG. 5C is a block diagram illustrating a shared concatenation used in the CASENet of FIG. 5A, according to embodiments of the present disclosure.
Figure 5B:
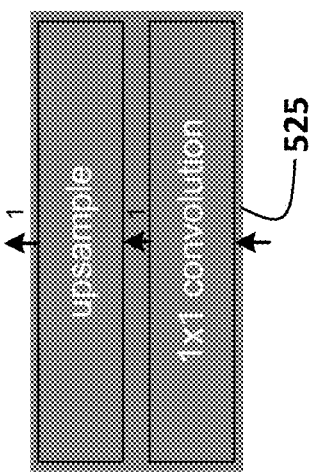
FIG. 5B is a block diagram illustrating a module used in the CASENet of FIG. 5A, according to embodiments of the present disclosure.

FIG. 5A is a block diagram illustrating an architecture of a category-aware semantic edge detection network (CASENet), according to embodiments of the present disclosure. FIG. 5B is a block diagram illustrating a module used in the CASENet of FIG. 5A, according to embodiments of the present disclosure. FIG. 5C is a block diagram illustrating a shared concatenation used in the CASENet of FIG. 5A, according to embodiments of the present disclosure.

CASENet Architecture

Upon reviewing the Basic and DSN architectures, we notice several potential associated issues in the category-aware semantic edge detection task. First, the receptive field of the bottom side is limited. As a result, it may be unreasonable to require the network to perform semantic classification at an early stage, given that context information plays an important role in semantic classification. We believe that semantic classification should rather happen on top where features are encoded with high-level information. Second, bottom side features are helpful in augmenting top classifications, suppressing non-edge pixels and providing detailed edge localization and structure information. Hence, they should be taken into account in edge detection.

According to embodiments of the present invention, the CASENet architecture (FIG. 5A) can be obtained by improving DSN network explained above. The improvement includes modifications summarized below:
1. Replace the classification modules at bottom sides to the feature extraction modules.
2. Put the classification module and impose supervision only at the top of the network.
3. Perform shared concatenation (515 in FIG. 5C and 510 in FIG. 5A) instead of sliced concatenation.

The difference between side feature extraction (525 in FIG. 5B and 520 in FIG. 5A) and side classification (420 in FIG. 4A) is that the former only outputs a single channel feature map $F^{(j)}$ rather than K class activations. The shared concatenation replicates the bottom features $F = \{F^{(1)}, F^{(2)}, F^{(3)}\}$ from Side-1-3 to separately concatenate with each of the K top activations:

$$A^f = \{F, A_1^{(5)}, F, A_2^{(5)}, F, A_3^{(5)}, \ldots, F, A_k^{(5)}\}. \quad (4)$$

The resulting concatenated activation map is again fed into the fused classification layer with K-grouped convolution to produce a K-channel activation map $A^{(6)}$.

CASENet can be a joint edge detection and classification network by letting lower level features participating and augmenting higher level semantic classification through a skip-layer architecture.

Experiments

We discuss CASENet1 with previous state-of-the-art methods, including InvDet, HFL, weakly supervised object boundaries, as well as several baseline network architectures.

Datasets

We evaluate the methods on SBD, a standard dataset for benchmarking semantic edge detection. Besides SBD, we also extend our evaluation to Cityscapes, a popular semantic segmentation dataset with pixel-level high quality annotations and challenging street view scenarios. To the best of our knowledge, our method is the first work to formally report semantic edge detection results on this dataset.

SBD

The dataset consists of 11355 images from the PASCAL VOC2011 trainval set, divided into 8498 training and 2857 test images 2. This dataset has semantic boundaries labeled with one of 20 Pascal VOC classes.

Cityscapes

The dataset contains 5000 images divided into 2975 training, 500 validation and 1525 test images. Since the labels of test images are currently not available, we treat the validation images as test set in our experiment.

Evaluation Protocol

On both SBD and Cityscapes, the edge detection accuracy for each class is evaluated using the official benchmark code and ground truth. We keep all settings and parameters as default, and report the maximum F-measure (MF) at optimal dataset scale (ODS), and average precision (AP) for each class. Note that for Citiscapes, we follow exactly to generate ground truth boundaries with single pixel width for evaluation, and reduce the sizes of both ground truth and predicted edge maps to half along each dimension considering the speed of evaluation.

Implementation Details

We trained and tested CASENet, HED, and the proposed baseline architectures using the Caffe library.

Training Labels

Considering the misalignment between human annotations and true edges, and the label ambiguity of pixels near boundaries, we generate slightly thicker ground truth edges for network training. This can be done by looking into neighbors of a pixel and seeking any difference in segmentation labels. The pixel is regarded as an edge pixel if such difference exists. In our paper, we set the maximum range of neighborhood to be 2. Under the multi-label framework, edges from different classes may overlap.

Baselines

Since several main comparing methods such as HFL and HED use VGG or VGG based architectures for edge detection and categorization, we also adopt the CASENet and other baseline architectures on VGG (denoted as CASENet-VGG). In particular, we remove the max pooling layers after conv4, and keep the resolutions of conv5, fc6 and fc7 the same as conv4 (⅛ of input). Both fc6 and fc7 are treated as convolution layers with 3×3 and 1×1 convolution and dimensions set to 1024. Dilation factors of 2 and 4 are applied to conv5 and fc6. To compare our multi-label framework with multi-class, we generate ground truth with non-overlapping edges of each class, reweight the softmax loss similar to our paper, and replace the top with a 21-class reweighted softmax loss.

Initialization

In our experiment, we initialize the convolution blocks of ResNet/VGG in CASENet and all comparing baselines with models pre-trained on MS COCO (Microsoft Common Objects in Context) dataset.

Hyper-Parameters

We unify the hyper-parameters for all comparing methods with the same base network, and set most of them following HED. In particular, we perform SGD with iteration size of 10, and fix loss weight to be 1, momentum 0.9, and weight decay 0.0005. For methods with ResNet, we set the learning rate, step size, gamma and crop size to 1e-7/5e-8, 10000/20000, 0.1/0.2 and 352×352/472×472 respectively for SBD and Cityscapes. For VGG, the learning rate is set to 1e-8 while others remain the same as ResNet on SBD. For baselines with softmax loss, the learning rate is set to 0.01 while other parameters remain the same. The iteration numbers on SBD and Cityscapes are empirically set to 22000 and 40000.

Data Augmentation

During training, we enable random mirroring and cropping on both SBD and Cityscapes. We additionally augment the SBD data by resizing each image with scaling factors {0.5, 0.75, 1.0, 1.25, 1.5}, while no such augmentation is performed on Cityscapes.

Results on SBD

FIG. 6. is a table indicating the MF scores of different methods performing category-wise edge detection on SBD, where CASENet outperforms previous methods. Upon using the benchmark code, one thing we notice is that the recall scores of the curves are not monotonically increasing, mainly due to the fact that post-processing is taken after thresholding in measuring the precision and recall rates. This is reasonable since we have not taken any post processing operations on the obtained raw edge maps. We only show the MF on SBD since AP is not well defined under such situation. The readers may kindly refer to supplementary materials for class-wise precision recall curves.

Multi-Label or Multi-Class?

We compare the proposed multi-label loss with the reweighted softmax loss under the Basic architecture. One could see that using softmax leads to significant performance degradation on both VGG and ResNet, supporting our motivation in formulating the task as a multi-label learning problem, in contrast to the well accepted concept which addresses it in a multi-class way.

Is Deep Supervision Necessary?

We compare CASENet with baselines network architectures including Basic and DSN illustrated in FIGS. 4A, 4B and 4C. The result empirically supports our intuition that deep supervision on bottom sides may not be necessary. In particular, CASENet wins frequently on per-class MF as well as the final mean MF score. Our observation is that the annotation quality to some extent influenced the network learning behavior and evaluation, leading to less performance distinctions across different methods. Such distinction becomes more obvious on Cityscapes.

Is Top Supervision Necessary?

One might further question the necessity of imposing supervision on Side-5 activation in CASENet. We use CASENet— to denote the same CASENet architecture without Side-5 supervision during training. The improvement upon adding Side-5 supervision indicates that a supervision on higher level side activation is helpful. Our intuition is that Side-5 supervision helps Side5 focusing more on the classification of semantic classes with less influence from interacting with bottom layers.

From ResNet to VGG

CASENet-VGG in FIG. 6 shows comparable performance to HFL-FC8. HFL-CRF performs slightly better with the help of CRF post processing. The results to some extent shows the effectiveness our learning framework, given HFL uses two VGG networks separately for edge localization and classification. Our method also significantly outperforms the HED baselines, which gives 44/41 on MF/AP, and 49/45 with detection.

FIG. 7 is a table indicating simulation results on the Cityscape benchmark. All notations are similar to those used in FIG. 6.

Results on Cityscapes

We also train and test both DSN and CASENet with ResNet as base network on the Cityscapes. Compared to SBD, Cityscapes has relatively higher annotation quality but contains more challenging scenarios. The dataset contains more overlapping objects, which leads to more cases of multi-label semantic boundary pixels and thus may be better to test the proposed method. In FIG. 6, we provide both MF and AP of the comparing methods. To the best of our knowledge, this is the first paper quantitatively reporting the detection performance of category-wise semantic edges on Cityscapes. One could see CASENet consistently outperforms DSN in all classes with a significant margin.

Concluding Remarks

We proposed an end-to-end deep network for category-aware semantic edge detection. We show that the proposed nested architecture, CASENet, shows improvements over some existing architectures popular in edge detection and segmentation. We also show that the proposed multi-label learning framework leads to better learning behaviors on edge detection. Our proposed method improves over previous state-of-the-art methods with significant margins.

According to embodiments of the present disclosure, an image processing system performs multi-label semantic edge detection in an image. For instance, the image processing system may include an image interface to receive an image of a scene including at least one object, a memory to store a neural network trained for performing a multi-label edge classification of input images assigning each pixel of edges of objects in the input images into one or multiple semantic classes, a processor to transform the image into a multi-label edge-map using the neural network detecting an edge of the object in the image and assigning multiple semantic labels to at least some pixels forming the edge, and an output interface to render the multi-label edge-map.

In some cases, the neural network in the image processing system comprises a sequence of layers with sequentially decreasing spatial resolution, such as FIG. 3A, the width and height of layers in res2 is only a half of that of layers in res1, and layers in res 3 similarly only a half of res2.

Further, the neural network may combine outputs of at least some layers of the neural network into a tensor and performs the multi-label edge classification on the tensor. For example, in FIG. 5A, output from res5, res3, res2, and res1 are individually processed with side classification and side feature extraction and combined by the shared concatenation into a 4K-channeled tensor (where each channel is a real matrix).

The neural network of the image processing system is trained to minimize a loss function of a difference between the multi-label edge-map of training images performed by the neural network and ground truth multi-label edge-map of the training images having at least some edge pixels classified into multiple semantic classes, wherein the loss function independently determines classification errors for each semantic class, e.g. all of the classification error $L_k$ for each semantic class k in equation (1) are independent with each other.

In this case, the neural network comprises a set of layers for sequentially processing the input images, wherein the loss function is imposed on a subset of layers with receptive field greater than a threshold, e.g., in FIG. 5A, only side 5 classification layer and fused classification layer are imposed with the loss function (denoted by dashed lines), since the layers' receptive field is large enough to capture more context information than bottom layers such as res1, res2, and res3.

Furthermore, the loss function penalizes incorrect classification of the edge pixels more than incorrect classification of non-edge pixels, e.g., equation (1) uses the self-adaptive parameter $\beta$ to implement this. In some cases, the neural network of the image processing system may be a residual neural network.

According to embodiments of the present disclosure, a method can be described for a multi-label semantic edge detection. In this case, a method for multi-label semantic edge detection in an image uses a processor coupled to a memory storing a neural network trained for performing a multi-label edge classification of input images assigning each pixel of edges of objects in the input images into one or multiple semantic classes, wherein the processor is coupled with stored instructions implementing the method, wherein the instructions, when executed by the processor carry out at least some steps of the method, includes receiving an image of a scene including at least one object, transforming the image into a multi-label edge-map using the neural network detecting an edge of the object in the image and assigning multiple semantic labels to at least some pixels forming the edge, and rendering the multi-label edge-map.

In the method, the neural network comprises a sequence of layers with sequentially decreasing spatial resolution. In some cases, the neural network combines outputs of at least some layers of the neural network into a tensor and performs the multi-label edge classification on the tensor.

Further, the neural network is trained to minimize a loss function of a difference between the multi-label edge-map of training images performed by the neural network and ground truth multi-label edge-map of the training images having at least some edge pixels classified into multiple semantic classes, wherein the loss function independently determines classification errors for each semantic class.

In this case, the neural network may comprise a set of layers for sequentially processing the input images, wherein the loss function is imposed on a subset of layers with receptive field greater than a threshold.

Yet further, the loss function penalizes incorrect classification of the edge pixels more than incorrect classification of non-edge pixels. According to an embodiment of the present disclosure, the neural network of the method may be a residual neural network.

According to embodiments of the present disclosure, the instructions of the method describe above can be applied to a non-transitory computer readable storage medium for causing a processor to perform multi-label semantic edge detection in an image.

For instance, a non-transitory computer readable storage medium stores a neural network trained for performing a multi-label edge classification of input images assigning each pixel of edges of objects in the input images into one or multiple semantic classes and embodied thereon a program executable by a processor for performing a method. In this case, the method includes transforming, in response to receiving an image of a scene including at least one object, the image into a multi-label edge-map using the neural network detecting an edge of the object in the image and assigning multiple semantic labels to at least some pixels forming the edge, and rendering the multi-label edge-map.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure. Therefore, it is the object of the appended claims to cover all such variations and modifications as come within the true spirit and scope of the disclosure.

What is claimed is:

1. An image processing system for multi-label semantic edge detection in an image, comprising:
   an image interface to receive the image of a scene including at least one object;
   a memory to store a neural network trained for performing a multi-label edge classification of the image;
   a processor to transform the image into a multi-label edge-map based on the object using the neural network, wherein the neural network detects an edge of the object in the image and assign multiple semantic labels to each of pixels forming the edge of the object, wherein the neural network is trained to minimize a loss function of a difference between the multi-label edge-map of training images performed by the neural network and ground truth multi-label edge-map of the training images having at least some edge pixels classified into multiple semantic classes, wherein the loss function independently determines classification errors for each semantic class; and
   an output interface to render the multi-label edge-map.

2. The image processing system of claim 1, wherein the neural network comprises a sequence of layers with sequentially decreasing spatial resolution.

3. The image processing system of claim 1, wherein the neural networks combine outputs of at least some layers of the neural network into a tensor and performs the multi-label edge classification on the tensor.

4. The image processing system of claim 1, wherein the neural network comprises a set of layers for sequentially processing the input image, wherein the loss function is imposed on a subset of layers with receptive field greater than a threshold.

5. The image processing system of claim 1, wherein the loss function penalizes incorrect classification of the edge pixels more than incorrect classification of non-edge pixels.

6. The image processing system of claim 1, wherein the neural network is a residual neural network.

7. A method for multi-label semantic edge detection in an image, wherein the method uses a processor coupled to a memory storing a neural network trained for performing a multi-label edge classification of input images assigning each pixel of edges of objects in the input images into one or multiple semantic classes, wherein the processor is coupled with stored instructions implementing the method, wherein the instructions, when executed by the processor carry out at least some steps of the method, comprising:

receiving an image of a scene including at least one object;

transforming the image into a multi-label edge-map using the neural network detecting an edge of the object in the image and assigning multiple semantic labels to at least some pixels forming the edge, wherein the neural network is trained to minimize a loss function of a difference between the multi-label edge-map of training images performed by the neural network and ground truth multi-label edge-map of the training images having at least some edge pixels classified into multiple semantic classes, wherein the loss function independently determines classification errors for each semantic class; and rendering the multi-label edge-map.

8. The method of claim 7, wherein the neural network comprises a sequence of layers with sequentially decreasing spatial resolution.

9. The method of claim 7, wherein the neural networks combine outputs of at least some layers of the neural network into a tensor and performs the multi-label edge classification on the tensor.

10. The method of claim 7, wherein the neural network comprises a set of layers for sequentially processing the input images, wherein the loss function is imposed on a subset of layers with receptive field greater than a threshold.

11. The method of claim 7, wherein the loss function penalizes incorrect classification of the edge pixels more than incorrect classification of non-edge pixels.

12. The method of claim 7, wherein the neural network is a residual neural network.

13. A non-transitory computer readable storage medium storing a neural network trained for performing a multi-label edge classification of input images assigning each pixel of edges of objects in the input images into one or multiple semantic classes and embodied thereon a program executable by a processor for performing a method, the method comprising:

transforming, in response to receiving an image of a scene including at least one object, the image into a multi-label edge-map using the neural network detecting an edge of the object in the image and assigning multiple semantic labels to at least some pixels forming the edge, wherein the neural network is trained to minimize a loss function of a difference between the multi-label edge-map of training images performed by the neural network and ground truth multi-label edge-map of the training images having at least some edge pixels classified into multiple semantic classes, wherein the loss function independently determines classification errors for each semantic class; and rendering the multi-label edge-map.

14. The method of claim 13, wherein the neural network comprises a set of layers for sequentially processing the input images, wherein the loss function is imposed on a subset of layers with receptive field greater than a threshold.

15. The method of claim 13, wherein the loss function penalizes incorrect classification of the edge pixels more than incorrect classification of non-edge pixels.

16. The method of claim 13, wherein the neural network is a residual neural network.

* * * * *